July 3, 1962    D. O. DAVIES ET AL    3,041,834
SEALING FAILURE SENSOR
Filed March 7, 1960    2 Sheets-Sheet 1
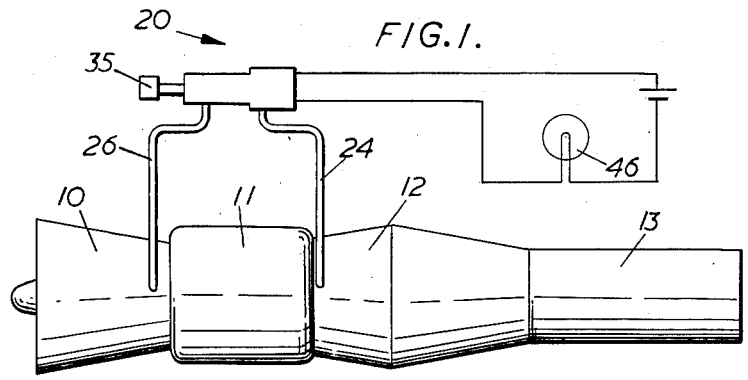
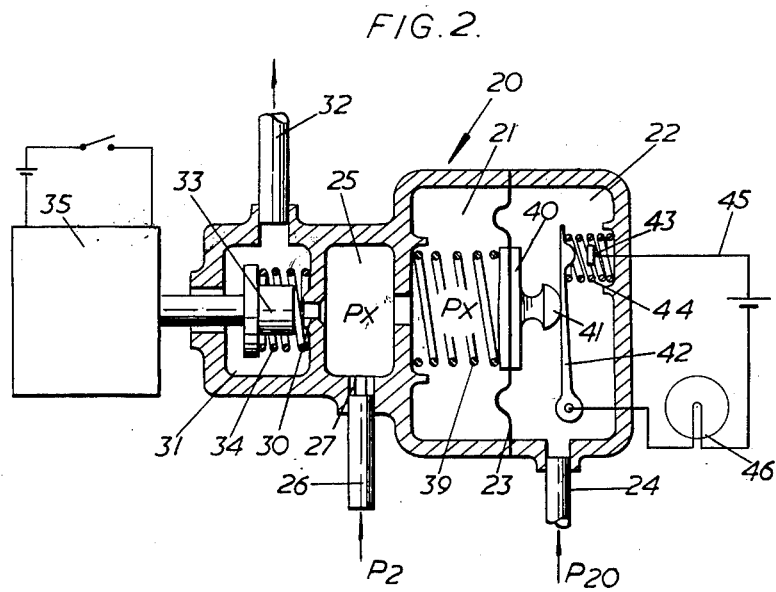
Inventors
DAVID OMRI DAVIES
FREDERICK LANGHAM GRINT
By
Cushman, Darby & Cushman
Attorneys

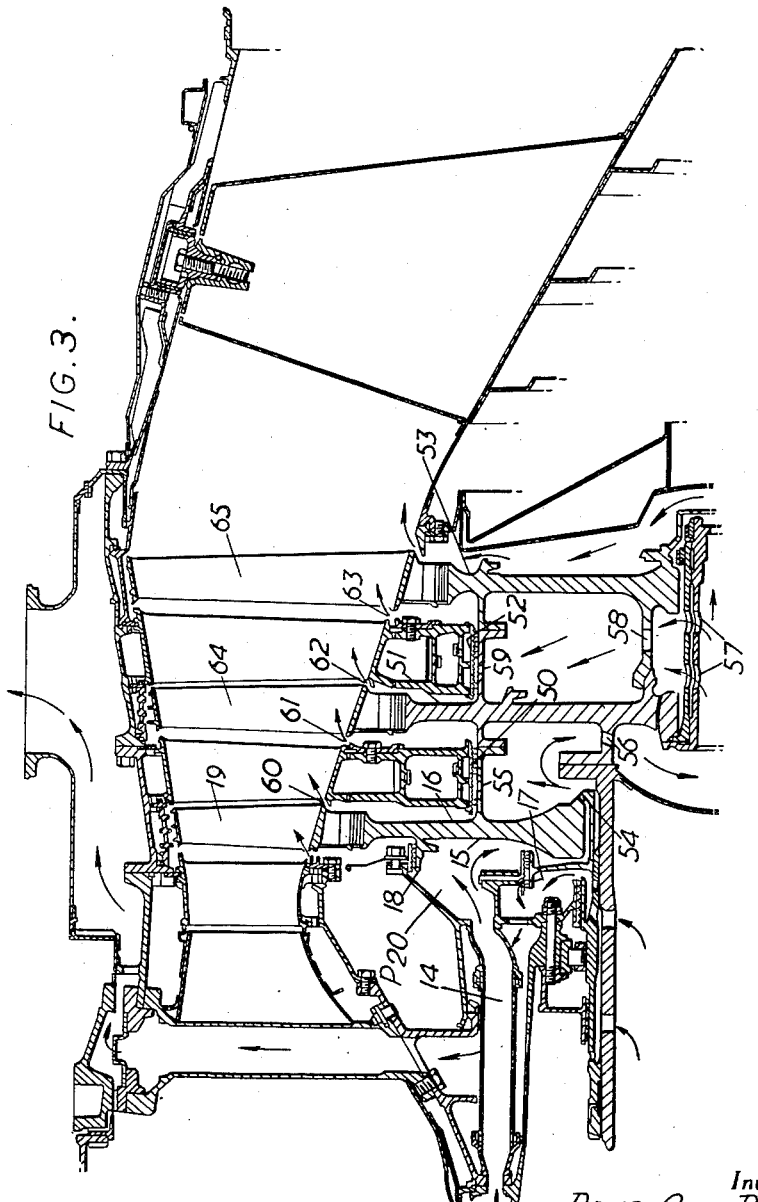

United States Patent Office 3,041,834
Patented July 3, 1962

3,041,834
SEALING FAILURE SENSOR
David Omri Davies, North Kingsway, Derby, and Frederick Langham Grint, Belper, England, assignors to Rolls-Royce Limited, Derby, England, a company of Great Britain
Filed Mar. 7, 1960, Ser. No. 13,089
Claims priority, application Great Britain Mar. 25, 1959
7 Claims. (Cl. 60—39.09)

This invention concerns sealing devices and, although it is not so restricted, it will for convenience be described hereinafter with reference to its use on a gas turbine engine.

According to the invention in its broadest form, there is provided apparatus comprising two compartments which are adapted to be supplied with fluids at relatively high and low pressures respectively, the compartments being separated from each other by a partition, said partition incorporating a seal through which restricted fluid flow can occur from the high pressure compartment to the low pressure compartment, and control means responsive to the pressure in the high pressure compartment or to a pressure functionally related thereto, said control means being adapted to control operation of a device for indicating failure of said seal and/or to control operation of the said apparatus.

The said apparatus may comprise means for producing a supply of high pressure fluid, said high pressure compartment forming part of a duct communicating with said supply means, the control means comprising a pressure responsive member opposite faces of which are respectively subjected to the pressure in the high pressure compartment and the pressure of the fluid supplied by the supply means, or to pressures functionally related thereto.

Means may be provided for temporarily increasing the pressure on that face of the pressure responsive member which is open to the supply pressure or to the pressure functionally related thereto, whereby to test operation of the control means. The said face may form one wall of a chamber which is arranged to be supplied with fluid at the supply pressure or at a pressure functionally related thereto, said chamber being provided with a restricted fluid outlet which is normally open, means being provided for temporarily closing the restricted fluid outlet.

The control means may comprise a make and break device in an electric circuit, said circuit incorporating a warning lamp and/or means for shutting down the apparatus.

The seal may be a labyrinth seal or a self clearing seal.

In its preferred form, the invention includes a gas turbine engine comprising a duct through which cooling air may flow from the compressor of the engine to one face of a turbine disc of the engine, said duct incorporating a seal adapted to permit the passage therethrough of a restricted quantity of the cooling air, and control means, responsive to the pressure in said duct adjacent the turbine disc, or to a pressure functionally related thereto, said control means being adapted to control operation of a device for indicating failure of said seal and/or for shutting down the engine.

There may be a plurality of turbine discs and a corresponding plurality of seals and control means.

The invention is illustrated, merely by way of example, in the accompanying drawings in which:

FIGURE 1 is a schematic representation of a gas turbine engine embodying the invention, FIGURE 2 is a schematic section through a part of the engine shown in FIGURE 1, and FIGURE 3 is a broken away section through another part of the engine shown in FIGURE 1.

Referring first to FIGURE 1, a gas-turbine jet-reaction engine of an aircraft comprises a compressor 10, combustion equipment 11, a turbine 12 and jet pipe 13.

A part of the turbine 12 is shown in FIGURE 3 and, as will be seen in that FIGURE, the turbine 12 comprises an H.P. stage and two L.P. stages. A duct 14 is provided through which compressor delivery air may pass to the front face 15 of the H.P. turbine disc 16 whereby to cool the latter. The pressure of this air at the delivery end of the compressor and at the front face 15 will be represented hereinafter by the symbols $P_2$ and $P_{20}$ respectively.

The turbine disc 16 is provided with inner and outer labyrinth seals 17, 18 which permit a restricted flow of cooling air therethrough. The pressure $P_{20}$ is greater than that of the gases passing through the turbine. Accordingly in normal circumstances, there will be an outward flow of cooling air through the labyrinth seals 17, 18. It will of course be appreciated that if one or both of the seals 17, 18 were to fail the pressure $P_{20}$ would fall with the result that pressure on either side of the seals would equalize and there would be an exchange of hot and cold gases therethrough causing swift overheating of the turbine disc 16. A pressure responsive warning device 20 (FIGURES 1 and 2) is, however, provided to give warning of such failure.

The warning device 20 is provided with chambers 21, 22 which are separated from each other by a diaphragm 23. The chamber 22 is supplied with $P_{20}$ air by way of a pipe 24 which communicates with the part of the duct 14 adjacent the turbine disc 16. The chamber 21 communicates with a chamber 25 which is supplied with $P_2$ air via a pipe 26 which communicates with the delivery side of the compressor 10. The pipe 26 incorporates a restriction 27 so that the pressure $Px$ in the chambers 25, 21 is reduced to one suitable for the operation of the diaphragm 23.

The chamber 25 communicates by way of a restriction 30, with a chamber 31, the latter being connected by way of a pipe 32 to the jet pipe 13 or to an overboard vent (not shown). The restriction 30 is closable by a valve closure member 33 which is normally urged towards an unseated position by a spring 34, a solenoid 35 being provided to close the valve closure member 33.

The diaphragm 23, which is acted upon by a spring 39, carries a plate 40 having a head 41 which engages a pivoted contact member 42. The contact member 42 is adapted to make contact with a contact member 43, the contact members 42, 43 being normally urged away from each other by means of a spring 44. The contact members 42, 43 are disposed in an electrical circuit 45 which incorporates a warning lamp 46 or which could for example incorporate electrical equipment adapted to operate a pneumatic servo to shut down the engine.

The operation of the device as so far described is as follows. Assuming that the expected normal pressure ratio $P_2:P_{20}$ is, say 1.08:1, the warning device would be so arranged that at ratios of up to, say, 1.20:1 the diaphragm 23 would be so disposed that the contacts 42, 43 remain spaced apart. This difference between the ratios 1.08:1 and 1.20:1 is such as to provide allowance for factors such as production variation in seal clearances and distortion in service.

However, if the seals 17, 18 fail, the pressure $P_{20}$ would fall and the arrangement could be that if the $P_2:P_{20}$ ratio exceeded 1.20:1 the contacts 42, 43 would make and the lamp 46 would light.

Inflow of hot gases onto the front face 15 of the H.P. turbine disc 16 will however not occur until the ratio $P_2:P_{20}$ is in the range 1.4 to 1.75 depending on engine speed. The device 20 therefore gives warning of seal failure before such failure results in the inflow of hot gases.

An interstage disc seal 50 of the labyrinth type is provided between the H.P. turbine disc 16 and a first L.P. turbine disc 51 while an interstage disc seal 52 of the labyrinth type is provided between the first L.P. turbine disc 51 and the second L.P. turbine disc 53. The $P_{20}$ air from the duct 14 reaches the seal 50 via orifices 54, 55 and reaches the seal 52 via the orifice 54 and via orifices 56–59. Cooling air which has passed through the seals 50, 52 may pass via seals 60–63 into the hot gas stream passing through the turbine.

If the seals 50, 52 were to fail, the pressure $P_{20}$ would drop and it could be arranged that this effected lighting of the lamp 46. Alternatively a number of warning devices 20 could be provided, the chamber 22 of each device being supplied with cooling air tapped from a position adjacent the respective seal.

The solenoid 35 of the or each warning device 20 is provided to permit testing of the device. On energisation of the solenoid the pressure $Px$ in the chamber 21 will rise so as to effect closure of the contact members 42, 43 and hence lighting of the lamp 46.

Closure of the contact members 42, 43 so as to effect testing, instead of being brought about by increasing the pressure in the chamber 21 could, of course, be achieved alternatively by decreasing the pressure in the chamber 22.

Thus a restricted passage could be provided communicating with an opening in the wall of the chamber 22, the restriction being adapted to be blocked and unblocked by a solenoid valve equivalent to the device 33, 35. The arrangement would be that the restriction was normally blocked but was unblocked when it was desired to test the device.

The restriction 27 instead of being a fixed restriction as shown could be made adjustable so as to allow for differences in the performance of different engines.

The pipes 26, 24, instead of being connected up so as to deliver air at pressures $P_2$, $P_{20}$ respectively could be connected up so as to deliver air at pressures functionally related to the pressures $P_2$, $P_{20}$. Thus the pipe 26 could be supplied with air from a stage of the compressor while, the pipe 24 might communicate with the area adjacent the respective seal by way of a restriction.

Although the invention has been specifically described above with reference to the seals controlling the flow of cooling air onto the turbine blades, the invention is applicable to any seals through which restricted flow can occur. Thus it may be used to give warning of the failure of the seals on the front and centre bearings of a gas turbine engine.

We claim:

1. In combination: a gas turbine engine comprising a compressor, a turbine having a turbine disc and turbine blades carried thereby, a duct for supplying cooling air from said compressor to one face of said turbine disc, a seal forming part of said duct and adapted to permit passage therethrough of a restricted quantity of cooling air; a control means responsive to a pressure change functionally related to a pressure change in said duct adjacent said turbine disc and the inlet of said duct, said control means including a high pressure chamber and a low pressure chamber separated by a pressure responsive member movable by a change in pressure in one of said chambers, and a warning device operable by said pressure responsive member for indicating failure of said seal; and a testing device operatively connected to said control means and selectively operable for at least momentarily creating a pressure change therein while said gas turbine engine is running to thereby test operation of said control means.

2. The combination of claim 1 wherein said testing device includes a restrictive outlet for one of the chambers in said control means and valve means selectively operable to open and close said outlet.

3. The combination of claim 2 wherein said restrictive outlet is normally open and wherein said valve means is selectively operable to close said outlet to increase the pressure on the high pressure side of said pressure responsive member.

4. The combination of claim 1 wherein said warning device includes an electrical circuit and a warning lamp in said electrical circuit, said electrical circuit being energized by movement of said pressure responsive member.

5. The combination of claim 1 wherein said warning device includes means for controlling operation of said gas turbine engine.

6. An apparatus comprising: a first compartment supplied with a fluid at a relatively high pressure, a second compartment supplied with a fluid at a relatively lower pressure, a partition separating said first compartment from said second compartment, a seal forming part of said partition and through which restricted flow of fluid can occur from said first compartment to said second compartment, supply means for producing a supply of high pressure fluid in said first compartment, a duct communicating said supply means with said first compartment, a pressure responsive control member normally operable by failure of said seal, means for subjecting opposite faces of said control member to pressures functionally related to the pressure of the fluid in said first compartment and to the pressure of the fluid at the supply means, a device controlled by said control member for indicating failure of said seal, and means selectively operable for temporarily changing the pressure on one face of the control member while the control member is subjected to the functionally related pressures of the fluid in the first compartment and the fluid at the supply means whereby said control member can be tested.

7. Apparatus comprising: a first compartment supplied with fluid at a relatively high pressure, a second compartment supplied with a fluid at a relatively lower pressure, a partition separating said first compartment from said second compartment, a seal forming part of said partition and through which restricted flow of fluid can occur from said first compartment to said second compartment, supply means for producing a supply of high pressure fluid in said first compartment, a duct communicating said supply means with said first compartment, a pressure responsive control member normally operable by failure of said seal, a chamber, one of whose walls is constituted by said control member, means for supplying fluid to said chamber at a pressure functionally related to the pressure of the fluid at the supply means, said chamber having a restricted normally open fluid outlet, means for subjecting the face of the control member disposed exteriorly of said chamber to a pressure functionally related to the pressure of the fluid in said first compartment, a device controlled by said control member for indicating failure of said seal, and means selectively operable for temporarily closing said restricted fluid outlet to temporarily increase pressure within said chamber whereby said control member can be tested.

References Cited in the file of this patent

UNITED STATES PATENTS

| | | |
|---|---|---|
| 2,084,683 | Hewitt | June 22, 1937 |
| 2,258,224 | Sheppard | Oct. 7, 1941 |
| 2,625,013 | Howard et al. | Jan. 13, 1953 |
| 2,943,446 | Goodall et al. | July 5, 1960 |